No. 711,578. Patented Oct. 21, 1902.
T. H. MEANS.
MEAT NEEDLE AND LARDER.
(Application filed June 20, 1902.)
(No Model.)
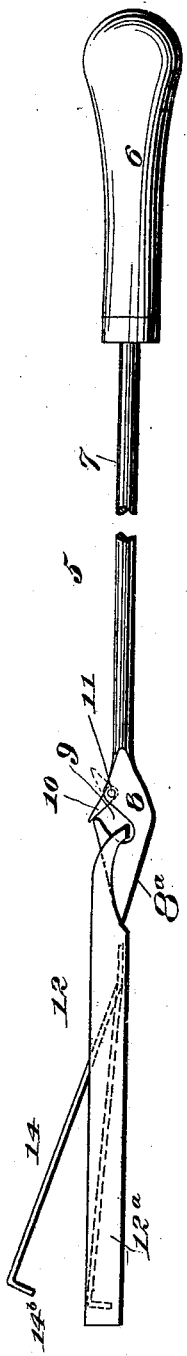
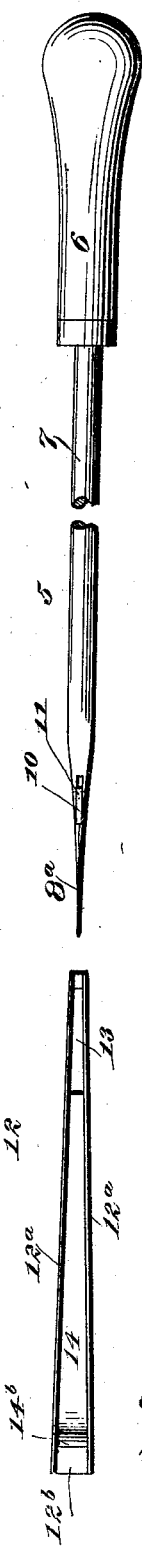
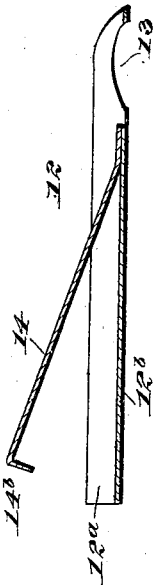

UNITED STATES PATENT OFFICE.

THOMAS H. MEANS, OF WAITSBURG, WASHINGTON.

MEAT NEEDLE AND LARDER.

SPECIFICATION forming part of Letters Patent No. 711,578, dated October 21, 1902.

Application filed June 20, 1902. Serial No. 112,525. (No model.)

*To all whom it may concern:*

Be it known that I, THOMAS H. MEANS, a citizen of the United States, residing at Waitsburg, in the county of Wallawalla and State of Washington, have invented certain new and useful Improvements in Meat Needles and Larders; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for larding meat and also for stringing hams and other meats and sewing beef-roasts together.

It comprises a needle of peculiar construction, by the use of which a string may be readily passed through a piece of meat, and also a larding device to be used in connection with said needle.

Improved details in the construction and arrangement of the several parts of my invention will be apparent from the detailed description hereinafter and the appended claim, when taken in connection with the accompanying drawings, forming part hereof, in which—

Figure 1 is the side elevation of the needle, showing the larding device secured thereto. Fig. 2 is a plan view of the needle and larding device detached. Fig. 3 is a central vertical section through the larding device.

Referring specifically to the drawings, 5 indicates a needle having a handle 6, a cylindrical shank 7, and a spear-shaped point 8. The point is provided with sharp cutting edges $8^a$ and a recess 9. At the mouth of said recess a slot is cut, and a latch 10 is pivoted therein, as indicated at 11. Said latch is adapted to cover and uncover the recess 9.

The device which is used in connection with the needle for the purpose of larding meat I designate a "larder." It comprises a casing 12, adapted to inclose strips of fat pork to be inserted in the meat. The casing has side walls $12^a$ and a bottom $12^b$. It is open at the top. An opening 13 in the bottom wall $12^b$, near one end thereof, is for the purpose of attaching the larder to the needle. This end of the casing is also very narrow in order that it may readily enter the meat. A flat spring 14 is secured to the upper side of the bottom wall $12^b$. It is for the purpose of holding the pork in the larder while it is being drawn through the meat. The end of this spring is turned down, as indicated at $14^b$.

The operation of my device is as follows: If it is desired to string a ham or other piece of meat, the needle is pushed through the same, which is readily accomplished by reason of the sharp cutting edge of the spear-shaped point 8. When the needle protrudes sufficiently so as to expose the recess 9, a string is passed therethrough, and the needle is then pulled back through the meat, carrying the string with it. The barb $9^a$, formed by the recess 9, does not prevent this, as the latch 10 is pulled back over it when the needle is drawn back through the meat.

To lard a piece of meat, a strip of the pork is placed in the larder. The needle is then pushed through the meat, as before, and the larder is hooked thereto by passing the barb $9^a$ through the opening 13. The needle is then pulled back through the meat, carrying the larder with it, the latch 10 closing, as before, and preventing the barb $9^a$ from interfering with the passage of the needle through the meat. It also prevents the larder being disconnected from the needle. The spring 14 is pressed down, as shown by dotted lines in Fig. 1, when the larder enters the meat, thus holding the pork until the larder is withdrawn, it then springing upward and allowing the pork to remain in the meat.

Having thus described my invention, what is claimed as new, and desired to be secured by Letters Patent, is—

A larding device comprising a channeled holder having an eye at one end, a spring fastened at that end and extending toward the other end, and means at the free end of the spring for engaging material placed within the holder, substantially as shown and described.

In testimony whereof I affix my signature in presence of two witnesses.

THOMAS H. MEANS.

Witnesses:
H. J. MURPHY,
D. V. WOOD.